(12) United States Patent
Kynard et al.

(10) Patent No.: US 11,168,453 B2
(45) Date of Patent: Nov. 9, 2021

(54) ALTERNATING SIDE-BAFFLE FISH LADDER FOR PASSING FISH AT DAMS OR NATURAL BARRIERS

(71) Applicants: Boyd Kynard, Amherst, MA (US); Brian Kynard, Amherst, MA (US)

(72) Inventors: Boyd Kynard, Amherst, MA (US); Brian Kynard, Amherst, MA (US)

( * ) Notice: Subject to any disclaimer, the term of this patent is extended or adjusted under 35 U.S.C. 154(b) by 0 days.

(21) Appl. No.: 16/553,652

(22) Filed: Aug. 28, 2019

(65) Prior Publication Data
US 2020/0256025 A1 Aug. 13, 2020

Related U.S. Application Data

(63) Continuation of application No. 16/270,442, filed on Feb. 7, 2019, now abandoned, and a continuation of application No. 16/042,906, filed on Jul. 23, 2018, now abandoned, which is a continuation of application No. 15/841,158, filed on Dec. 13, 2017, now abandoned.

(60) Provisional application No. 62/433,762, filed on Dec. 13, 2016.

(51) Int. Cl.
E02B 8/08 (2006.01)
(52) U.S. Cl.
CPC .................... *E02B 8/085* (2013.01)
(58) Field of Classification Search
CPC .......................................................... E02B 3/02
See application file for complete search history.

(56) References Cited

U.S. PATENT DOCUMENTS 3,962,876 A * 6/1976 Phillips .................. E02B 8/085
405/81
5,161,913 A * 11/1992 Boylan .................. E02B 8/085
405/83

FOREIGN PATENT DOCUMENTS

DE 102009044069 * 10/2013

OTHER PUBLICATIONS

Biette, R. M., and R. M. Odell. 1976. An assessment of a fish pass manufactured by Aeroceanics Fishway Corporation Final Rep., Ontario Ministry of Natural Resources, Ottawa, Canada, pp. 32.
Tredger, G.D., 1982, Experimental testing of kokanee (*Onchorhynchus nerka*) passage in an Aeroceanics spiral fishway at Meadow Creek, British Columbia, pp. 20.

* cited by examiner

*Primary Examiner* — Sean D Andrish
(74) *Attorney, Agent, or Firm* — Richard Kosakowski

(57) ABSTRACT

A fish ladder includes a channel with first and second sidewalls spaced apart at a channel width distance. Each of a first plurality of side-baffles is attached to the first sidewall and each of a second plurality of side-baffles is attached to the second sidewall. Each side-baffle extends a predetermined distance into the channel. A first slot opening width distance from a tip of each one of the first plurality of side-baffles across the channel and perpendicular to the second sidewall substantially equals a second slot opening width distance from a tip of each one of the second plurality of side-baffles across the channel and perpendicular to the first sidewall. A side-baffle spacing distance from a tip of each one of the first plurality of side-baffles and perpendicular to a corresponding one of the second plurality of side-baffles located upstream substantially equals the first and second slot opening width distances.

13 Claims, 2 Drawing Sheets

ALTERNATING SIDE-BAFFLE FISH LADDER FOR PASSING FISH AT DAMS OR NATURAL BARRIERS

CROSS-REFERENCE TO RELATED APPLICATIONS

This application is a continuation of U.S. application Ser. No. 16/270,442, which is a continuation of U.S. application Ser. No. 16/042,906, which a continuation of U.S. application Ser. No. 15/841,158, which claims the benefit under 35 U.S.C. § 119(e) of U.S. Provisional Application No. 62/433,762 filed Dec. 13, 2016, which are all hereby incorporated by reference.

STATEMENT REGARDING FEDERALLY SPONSORED RESEARCH OR DEVELOPMENT

This invention has been created without the sponsorship or funding of any federally sponsored research or development program.

FIELD OF THE INVENTION

This invention is an improvement in the design of alternating side-baffle fish ladders that enables weak-swimming and small fish to bypass river obstructions such as dams.

BACKGROUND OF THE INVENTION

Riverine fish species comprise the greatest percent of endangered vertebrates on Earth with blockage of upstream riverine migrations and segmentation of populations by dams a major factor causing their decline. Thus, there is a great need for an inexpensive fish ladder or fishway that passes diverse riverine fish species, many of which are less than six inches long as adults and have a weak-swimming ability. Trials with small fish, including small fish with a moderate swimming ability, like juvenile sturgeons, show that some fish can only ascend about six inches in water velocities about three fish body lengths per second. However, the understanding of swimming ability of small fish is poor, with estimates of the swimming distance of a four-inch-long fish to be only a few inches in a velocity of twelve inches per second. Based on this information, during development of the fish ladder of embodiments of the present invention, target velocities in side-baffle slot openings or "slots" were set at three to four body lengths per second (i.e., target velocities in the range of 12-17 inches per second) to be able to pass a four-inch-long fish through the entire length of the fish ladder.

Known full baffle fishways, such as the Denil and Alaskan Steeppass which are used frequently in the United States and Canada, are only effective for passing strong swimming fish such as salmon and trout, or large adults of a few riverine species, like white sucker and smallmouth bass. Furthermore, these fishways are often expensive, complex, difficult to install and maintain free of debris, can be damaged by winter icing and floods, and require water flows of 4-6 cubic feet per second to pass fish upstream therethrough. Increasing droughts, occurring during climate warming, make it important for new 21$^{st}$ Century fish ladder designs to operate at relatively low water flows.

The absence of a known fish ladder design that works for weak-swimming fish, particularly for small fish in North America, provided the conservation goal to conduct hydraulic and fish passage research in a private hydraulic laboratory to develop the improved design of embodiments of the present invention for an alternating side-baffle fish ladder that passes weak-swimming non-salmonid fish species, particularly, small fish, which form the bulk of native riverine fish communities of which about 80% of all species are migratory.

These and other difficulties experienced with prior art fish ladders or fishways have been improved in a novel manner by a fish ladder of embodiments of the present invention.

It is, therefore, an object of some embodiments of the present invention to provide an improved design for an alternating side-baffle fish ladder that is based on dimensional relationships between side-baffles and of side-baffles to channel width that greatly reduces energy in water flow and creates habitats that assist weak-swimming fish (particularly, small fish) to pass around river obstructions in an efficient and effective manner.

Another object of some embodiments of the present invention is to provide a fish ladder that provides zero-negative flow eddies (i.e., a fish resting habitat) along the length of the ladder.

Yet another object of some embodiments of the present invention is to maintain slow velocities in the ladder both at low flows with relatively low water depths (5-6 inches) within 12-24 inch-high channels, and at high flows (i.e., channel full depth in 12-24 inch-high channels), to therefore pass small fish over the full range of channel flow.

Still another object of some embodiments of the present invention is to provide a fish ladder that is easy to maintain free of aquatic and terrestrial debris.

A further object of some embodiments of present invention is to provide a fish ladder that is easy to design and build, is modular in construction, and is easy to assemble and install at dams.

It is another object of some embodiments of the present invention to provide a fish ladder that is inexpensive.

With these and other objects in view, as will be apparent to those skilled in the art, the invention resides in the combination of components set forth in the specification and covered by the claims appended hereto, it being understood that changes in a precise embodiment of the invention disclosed herein may be made within the scope of what is claimed without departing from the spirit of the invention.

BRIEF SUMMARY OF THE INVENTION

A fish ladder allows fish of varying sizes and swimming abilities to swim therethrough from a point downstream of a barrier located in flowing water to a point upstream of the barrier. The fish ladder includes a channel having a first sidewall and a second sidewall spaced apart at a channel width distance, the channel allowing water to flow therethrough; and a bottom plate attached to the first sidewall and the second sidewall at a bottom point of the channel. The fish ladder also includes a first plurality of side-baffles, each of the first plurality of side-baffles attached to the first sidewall and extending a predetermined distance into the channel; and a second plurality of side-baffles, each of the second plurality of side-baffles attached to the second sidewall and extending a predetermined distance into the channel. A first slot opening width distance from a tip of each one of the first plurality of side-baffles across the channel and perpendicular to the second sidewall substantially equals a second slot opening width distance from a tip of each one of the second plurality of side-baffles across the channel and perpendicular to the first sidewall. Also, a side-baffle spacing distance from a tip of each one of the first plurality of side-baffles and perpendicular to a corresponding one of the second plurality of side-baffles located upstream substantially equals the first slot opening width distance and the second slot opening width distance.

BRIEF DESCRIPTION OF THE DRAWINGS

The character and improved hydraulic conditions for passing weak-swimming fish created by the invention may be best understood by reference to its structural form, water flow vectors and velocities, and the presence of major habitat features as illustrated by the accompanying drawings, in which.

DETAILED DESCRIPTION OF THE INVENTION

Figure 1:
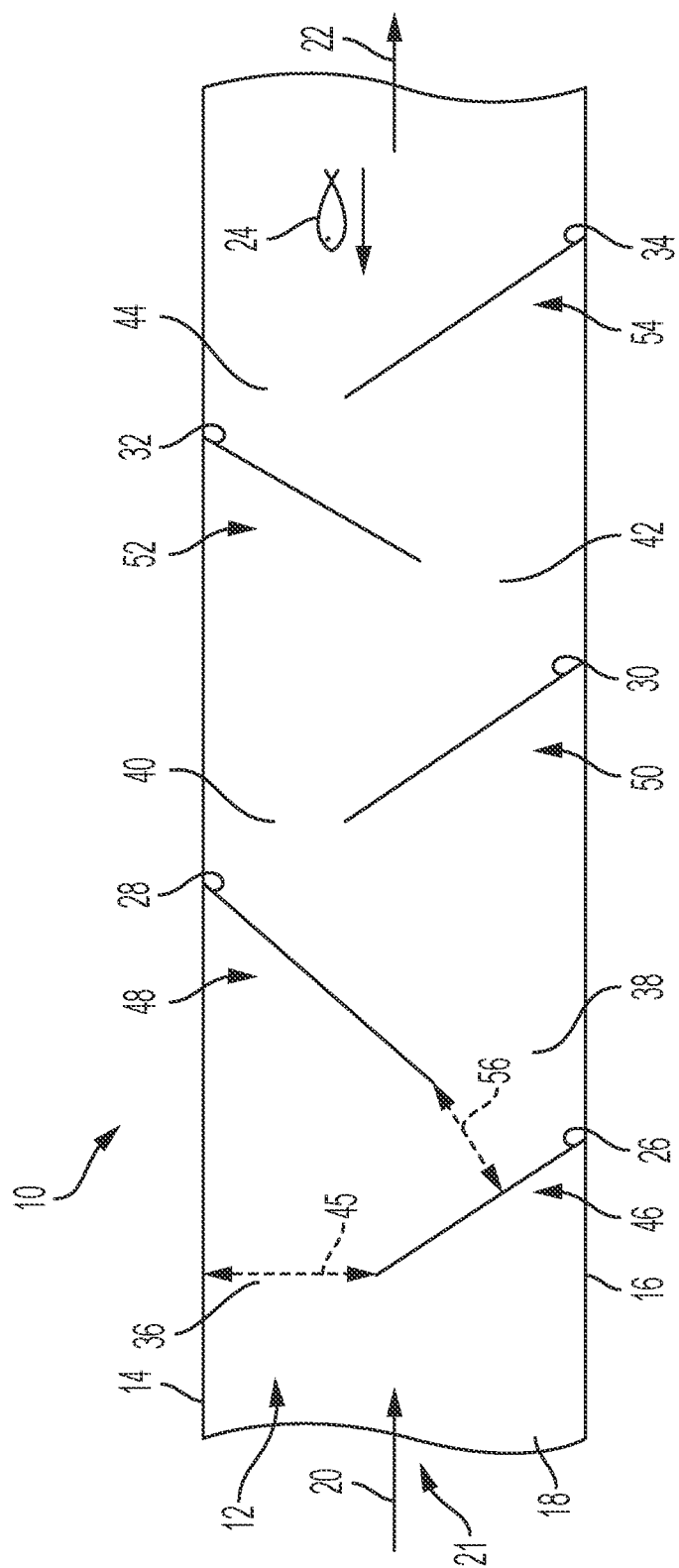
FIG. 1 is a plan view of a straight section of a fish ladder of an exemplary embodiment of the present invention having five side-baffles and showing the dimensional relationships between the side-baffles and between the side-baffles and the channel width.

Referring to FIG. 1, there illustrated is an exemplary embodiment of an alternating side-baffle fish ladder 10 ("ASBL") of the present invention. Two embodiments or prototype models of the fish ladder 10 of the present invention have been constructed and studied for their hydraulics and the ascent or passage of fish through the entire length of the ladder 10. The embodiment of the fish ladder 10 shown in FIG. 1 may be termed the "Model 1 ASBL," which is a fish ladder 10 having an exemplary length of 25 feet. The ladder 10 of FIG. 1 includes a water channel 12 formed integral with the ladder 10, the water channel 12 being 12 inches (one foot) wide and 12 inches (one foot) high throughout its length in the embodiment of FIG. 1. However, the present invention is not limited as such; other dimensions for the width and/or height of the water channel 12 may be apparent to one of ordinary skill in the art in light of the teachings herein. Although shown primarily as comprising a straight section in FIG. 1, the ladder 10 may instead have solely curved sections, or both straight and curved sections (90° and 180°). The Model 1 ASBL of FIG. 1 was used to develop the basic dimensional relationships of the design of the fish ladder 10. Also, a second embodiment of the fish ladder 10 may be termed the "Model 2 ASBL," which is described in more detail herein.

The water channel 12 is formed by two sidewalls 14, 16, each 12 inches high, that are opposed to one another in parallel and span the entire length of the ladder 10. The sidewalls 14, 16 are disposed in a vertical orientation when the fish ladder 10 is deployed for typical use in a river or other flowing body of water. A bottom of each sidewall 14, 16 is attached or connected to an upper surface of a bottom plate 18 which is disposed largely horizontally in general when the ladder 10 is deployed for use. A first arrowhead 20 indicates the direction of the natural flow of water within the river from an upstream area at a water entrance 21 of the water channel 12, the water then flowing downstream through the water channel 12 to a water exit of the water channel 12. A second arrowhead at fish 24 indicates the direction of travel of fish as they attempt to enter the water channel 12 at the water exit 22 and ascend or travel upstream though the water channel 12 in the opposite direction to the natural flow of water through the water channel 12, and then exit through the water entrance 21. In a typical installation and usage of the fish ladder 10 of embodiments of the present invention, the water entrance 21 of the water channel 12 is located upstream or above an obstruction or barrier (e.g., a dam or other natural or man-made barrier) in a river or other flowing body of water. Also, the water exit 22 is located downstream or below the obstruction or barrier on the river's shoreline. When utilized in a river or flowing body of water, the fish ladder 10, and thus the water channel 12, is typically deployed or tilted at an angle with respect to a horizontal position, which is referred to as the slope of the fish ladder 10 and is typically measured or expressed as the downward angle from the top upstream end portion of the fish ladder 10 to the downstream end portion of the fish ladder 10. In exemplary embodiments of the present invention, the slope of the fish ladder 10, and thus the water channel 12, may be in a range of from 5° to 9°, and preferably 8°.

The water channel 12 also includes a plurality of uniformly spaced side-baffles 26, 28, 30, 32 and 34. In the exemplary embodiment of the fish ladder 10 of FIG. 1, five such side-baffles 26-34 are shown. However, it should be understood that more or less than five side-baffles 26-34 may be utilized in embodiments of fish ladders 10 given the teachings herein. Each side-baffle 26-34 in fish ladder 10 is 12 inches high and is attached vertically to each sidewall 14, 16. The placement of the side-baffles 26-34 on the sidewalls 14, 16 is such that they alternate from side to side along the length of the water channel 12.

In accordance with the present invention, the side-baffles 26-34 are angled upstream at a predetermined angle, thereby creating a corresponding vertical side-baffle slot width or opening ("slot") 36, 38, 40, 42 and 44 between the end of each baffle 26-34 and the opposing sidewall 14, 16. The size of slot width or opening is measured starting at the outer tip of a side-baffle 26-34, then across the water channel 12 at 90° to the opposing sidewall 14, 16. The dotted line with arrowheads 45 illustrates this slot opening measurement for the particular side-baffle 26 and sidewall 14.

Also, V-shaped energy dissipation pockets 46, 48, 50, 52 and 54 are formed by the junction or connection point of each side-baffle 26-34 with its associated sidewall 14, 16. Each pocket 46-54 is located directly downstream of the corresponding side-baffle slot opening 36-44 (e.g., pocket 48 is located downstream of slot opening 36). In the exemplary embodiment of FIG. 1, each side-baffle 26-34 is disposed at a 60° angle with respect to the associated sidewall 14, 16. However, that angle may range from 55° to 65°. Also, each side-baffle 26-34 is approximately 8.28 inches in length. As such, each slot opening 36-44 is approximately five inches in length.

Through investigation and study, the correct hydraulic operations of an ASBL fish ladder 10, such as the ladder 10 shown in FIG. 1, occur within a range of channel slopes and dimensional relationships of side baffles to each other and of side-baffles to the channel width. These are the hydraulic operations that allow fish of varying sizes, including small fish of four inches in length, to successfully ascend and pass through the entire length of the ladder 10 without harm done to them by the ladder 10. The critical factors for correct design and proper operation of the ASBL fish ladder 10 are as follows: 1) Channel slope (straight or curved channel) equals 8% (a range of 5%-9%); 2) Side-baffle slot width or opening (straight or curved channel) equals 42% of channel width; 3) Distance of side baffles from each other (measured from the tip end of a downstream side-baffle to the side of the upstream side-baffle in straight or curved channels equals 42% of channel width (This is illustrated in FIG. 1 by the dotted line 56 drawn from the tip of side-baffle 28 perpendicular or at a 90° tangent to the upstream side-baffle 26); 4) Angle of side-baffles to the attachment sidewall (straight channel only) equals 60° (a range of 55°-65°); and 5) Angle of side-baffles to each other (straight and curved channels) equals 90° (a range of 85°-95°; as an imaginary line along the length of a downstream side-baffle extending to the side at 90° of the adjacent upstream side-baffle). That is, the amount of the slot opening 36-44 (#2 above) is substantially equal to the distance of the side-baffles 26-34 to each other (#3 above). In the exemplary embodiment of the fish ladder 10 of FIG. 1 having a 12-inch channel width, 42% of channel width equals 5 inches, which is represented by the length of each of the dotted lines 45 and 56.

For curved channels 12 of any width, the dimensional relationships for side-baffles 26-34 in the curve begin with the dimensions of the first side-baffle from the straight section of the ladder 10 that extends upstream into the curve. Due to the curved sidewall 14, 16, the angle of side-baffles 26-34 to the attachment sidewall cannot be used to determine dimensional relationships. Instead in curves, dimensional relationships between side-baffles 26-34 and between side-baffles and the channel width are determined by 1) distance between side-baffles (#3 above), 2) angle between a downstream side-baffle and the side of the upstream side-baffle equals 90° (#5 above), and 3) slot width equals 42% of channel width (#3 above). Upstream side-baffle length in curves equals the free end terminates at 42% of the channel width away from the sidewall and the side-baffle's opposite end terminates at the side-baffle attachment to the sidewall.

The dimensional relationships described above and illustrated in FIG. 1 have been used to design ASBLs with straight and curved channels with 90° and 180° circumference curves of two diameters, i.e., an eight-foot diameter curve for the one-foot-wide channel of the Model 1 ASBL, and a ten-foot diameter curve for the two-foot-wide Model 2 ASBL. The basic ASBL design can be scaled to work in even wider curved channels.

Initial hydraulic trials with the Model 1 ASBL were conducted at a 10% (1:10) slope of the fish ladder 10. These trials resulted in side-baffle slot velocities that exceeded target velocities. Subsequent trials of the same side-baffle layout using a ladder slope of 8% (1:12) resulted in target velocities in side-baffle slots. The Model 2 ASBL at 8% slope passed fish less than four inches long, so the ASBL design will pass weak-swimming and four-inch-long fish at estimated slopes in a range of 5% to 9%.

Channel full water flow in the Model 1 ASBL is 0.54 cubic feet per second, and in the Model 2 ASBL, channel full water flow is 4.3 cubic feet per second. Although the Model 2 ASBL flow is 8× the Model 1 ASBL flow, the Model 2 also passed small four-inch-long fish. This demonstrates the great energy dissipation of the ASBL design The Model 2 ASBL prototype was fabricated of 3/16 inch thick #304 steel painted with epoxy paint for aquaculture applications. For this prototype, the same type of steel was used for connector plates joining two contiguous modular ladder sections, ladder anchors, and the top bar-grate with one-inch open spaces on top of the entire ladder. In operation, the top bar-grate excluded debris from the prototype ladder during flooding and was particularly effective excluding leaf-drop from entering the prototype in the fall of 2017, which resulted in zero days loss of ladder operation.

Figure 2:
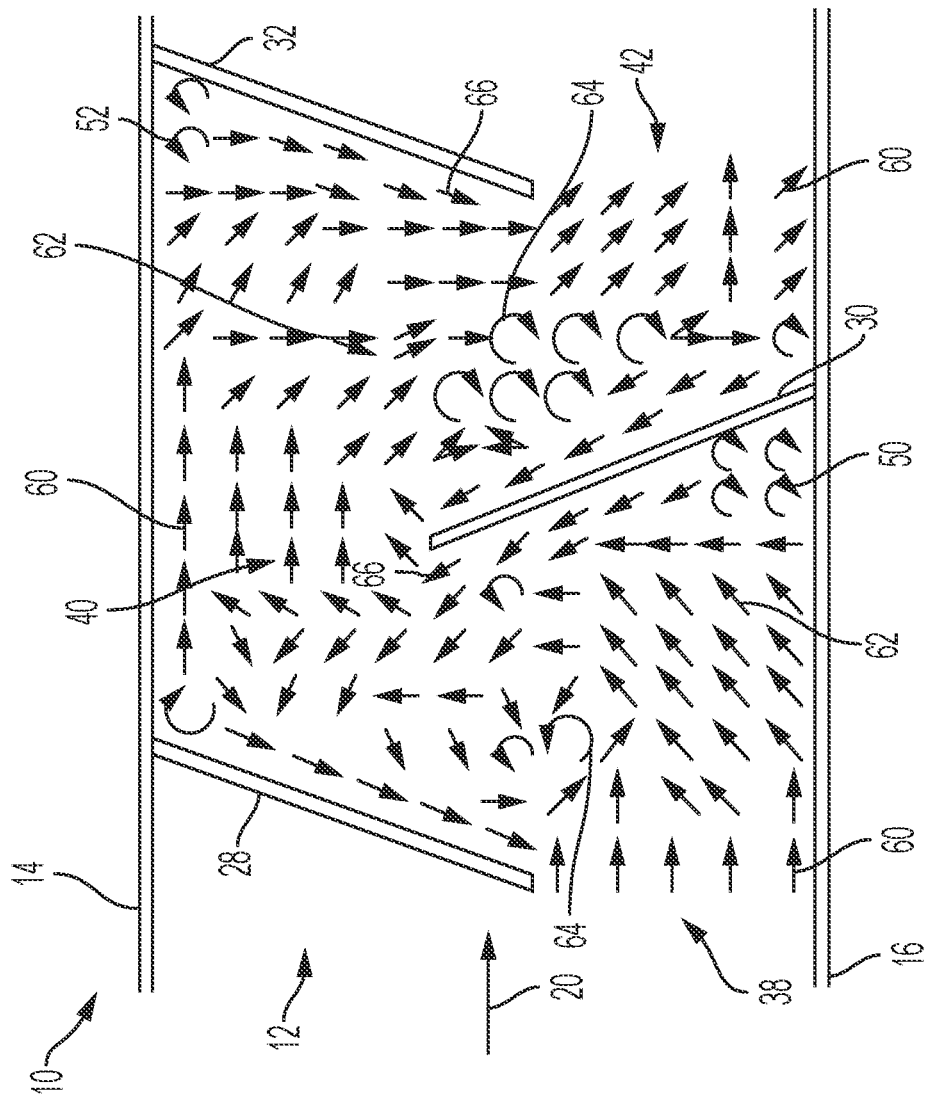
FIG. 2 is a plan view of a portion of the fish ladder of the embodiment of FIG. 1 having three side-baffles showing water flow vectors within the channel.

Referring to FIG. 2, there illustrated is a plan view of a portion of the embodiment of the fish ladder 10 illustrated in FIG. 1, showing three of the side-baffles 28, 30 and 32 of FIG. 1. Also illustrated are velocity vectors illustrating the flow of water within the water channel 12 that identify flow habitats available for small four-inch-long fish. Therein, water flows downstream first through side-baffle slot 38, then through side-baffle slot 40, and finally through side-baffle slot 42. Velocity vectors 60 demonstrate that flow through side-baffle slot openings 38, 40 are parallel to sidewalls 14, 16. However, as water flow moves just downstream of those side-baffle slot openings 38, 40, vectors 62 show that water flow moves across the channel 12 creating large eddies 64 with circular and negative vectors (i.e., upstream flow) just downstream of the entire length of side-baffles 28, 30. Also, vectors 66 show that the flow exiting V-shaped pockets 50, 52 flows along the upstream side of side-baffles 30, 32 crossing the top of the corresponding side-baffle slot opening 40, 42 at about 90° to the longitudinal axis of the slot opening 40, 42. Thus, fish ascending side-baffle slot openings do not have to swim directly into the flow of water; instead, fish can swim diagonally through the cross-channel flow to move upstream within the water channel 12. Underwater video of small minnows ascending the ASBL fish ladder 10 found that fish staged their ascent of a side-baffle slot opening by waiting at the upstream top of the eddy, and then, quickly swimming upstream about six inches through the side-baffle slot opening to the upstream eddy.

In an exemplary embodiment, the Model 2 ASBL fish ladder has a length of 75 feet and a water channel that is two feet wide and two feet high. Further, the Model 2 ASBL has both straight and curved sections (90° and 180°) that were used to test the ASBL design for performance under field conditions. The prototype Model 2 ASBL was assembled quickly (10 hours) and installed in 10 days at a private dam (Stockdale Mill Dam, Eel River, Ind.) in mid-August 2017. Both ASBLs successfully passed weak-swimming and small fish. The large size of some fish passed in the Models 1 and 2 ASBL suggests an appropriate channel size could pass the entire migratory fish community at dams.

The ASBL design passes small fish at low or high channel flows. Water vectors and velocities in the side-baffle slots of the Model 1 ASBL at low water depth (e.g., 6 inches) and at channel full depth (e.g., 12 inches) are similar. Further, small fish ascended the Model 1 ASBL at low and high flows. At the Model 2 ASBL prototype, on one day in the fall of 2017, 12 species of small fish ascended the ladder in a water depth of 5 inches, a channel flow of only 0.03 cubic feet per second. Small fish can ascend the 56 side-baffles in the Model 2 ASBL in low channel flows.

Measurement of flow vectors in FIG. 2 was done by visually observing the two-dimensional direction of movement in water flow by a 1.5-inch-long ribbon tied six inches above the end of a thin rod placed vertically on the channel bottom that sampled vectors on a one-inch grid across the bottom. Bottom water velocities measured in the three side-baffle ASBL shown in FIG. 2 were previously shown by FIG. 8 of U.S. published patent application US 2020/0256025, filed Dec. 13, 2017. The greatest velocities were within 1.5 inch at and just downstream of side-baffle slot openings 38 (mean, 20 inches per second) and 40 (mean, 22.4 inches per second). However, only 2.5 inches away from the sidewalls 14, 16, velocities in and just downstream of side-baffle slot openings were much slower and similar, i.e., at side-baffle slot opening 38 mean velocity was 13.6 inches per second and at side-baffle slot opening 40 mean velocity was 13.7 inches per second. Further, the eddies 64 had mostly negative velocities, i.e., in eddy 64 downstream of side-baffle 28, velocities ranged from +1.1 inches per second to −5.9 inches per second, and in eddy 64 downstream of side-baffle 30, velocities ranged from +1.6 inches per second to −8.7 inches per second. Because eddies are large and close to the top of side-baffle slot openings, small fish only need to swim 6-9 inches to ascend side-baffle slot openings in Models 1 or 2 ASBL.

Water depth varies greatly in ASBL channel 10 with water depth highest in V-shaped pockets 46-54 and in the flow along the upstream side of side-baffles (areas where energy in flow is strongly dissipated). Water depth is lowest in eddies 64 (FIG. 2). For example, when water depth is 12 inches in V-shaped pockets 46-54 and along the upstream edge of side-baffles, water depth in eddies is about 9 inches. The great elevation of flow against gravity in the V-shaped pockets and along the upstream side of side-baffles likely contributes significantly to reduction of energy in water flow.

Underwater video of fish swimming upstream in the Model 1 ASBL found suitable side-baffle slot velocities and slow velocity ascent-resting habitats were used to pass small (4 inch) long fish or even smaller fish. For example, during fish trials with the Model 1 ASBL, 34 common shiners were tested: 20 (59%) ascended to the top of the fish ladder 10 and the average body length of these 20 fish was 3.3 inches. Also, in September-November 2017, after the Model 2 ASBL prototype was operational, an estimated thousands of small fish were observed on a daily basis swimming to the top of the ladder 10. Sampling these fish at the top of the ladder on one day captured twelve species of minnows whose body sizes ranged from 1.5-8 inches. All results show the Models 1 and 2 ASBL perform as designed to pass small fish.

The Model 1 ASBL was developed to create slow water velocities to pass small fish (i.e., 4 inches long). However, trials in the Model 1 ASBL with 33 side baffles found the design also passed diverse larger fish, for example (species—number passed, and mean body length): white sucker—15, 7 inches; smallmouth bass—4, 8 inches; largemouth bass—1, 6.8 inches; and brook trout—1, 8.9 inches. Thus, a properly sized ASBL may pass the entire migratory fish community.

Trials with tree limbs of various lengths in the Model 1 ASBL found the side-baffle layout creates a strong flow regime that can move debris shorter than the channel width down and out of the channel.

Two new improvements to operation and maintenance of the prototype Model 2 installed at Stockdale Mill Dam follow: 1) a metal top-grate was welded on top of the ladder channel to provide support and exclude debris, and 2) a new method was used to join two modular side-baffle sections that made assembly quick and the ladder stiff.

As can be seen from the foregoing, embodiments of the fish ladder of the present invention represent an improvement of the design for an alternating side-baffle fish ladder in which a water carrying channel carries water from above a barrier in a river to below the barrier. Embodiments of the present invention use dimensional relationships of side-baffles to each other and of side-baffles to the channel width that creates a V-shaped energy dissipation pocket at the junction of each side-baffle with its attachment sidewall. The energy dissipation pocket greatly reduces energy in the water flow through the channel yet retains a strong enough flow that removes debris shorter than the channel width. Further, the side-baffle layout creates slow water velocities in the side-baffle slots and in the large eddy downstream of each side-baffle, which facilitates the passage or ascent of small fish through the channel (i.e., those having a length less than four inches).

It is obvious that minor changes may be made in the form and construction of the invention without departing from the material spirit thereof. It is not, however, desired to confine the invention to the exact form herein shown and described it is desired to include all such as properly come within the scope claimed.

The invention having been thus described, what is claimed as new and desired to be secured by Letters Patent is:

1. A fish ladder that allows fish of varying sizes and swimming abilities to swim therethrough from a point downstream of a barrier located in flowing water to a point upstream of the barrier, comprising:
   a channel having a first sidewall and a second sidewall spaced apart at a channel width distance, the channel allowing water to flow therethrough;
   a bottom plate attached to the first sidewall and the second sidewall at a bottom point of the channel;
   a first plurality of side-baffles, each of the first plurality of side-baffles attached to the first sidewall and extending a predetermined distance into the channel;
   a second plurality of side-baffles, each of the second plurality of side-baffles attached to the second sidewall and extending a predetermined distance into the channel;
   wherein a first slot opening width distance from a tip of each one of the first plurality of side-baffles across the channel and perpendicular to the second sidewall substantially equals a second slot opening width distance from a tip of each one of the second plurality of side-baffles across the channel and perpendicular to the first sidewall; and
   wherein a side-baffle spacing distance from a tip of each one of the first plurality of side-baffles and perpendicular to a corresponding one of the second plurality of side-baffles located upstream substantially equals the first slot opening width distance and the second slot opening width distance.

2. The fish ladder of claim 1, wherein dimensional relationships between the channel width distance, the first slot opening width distance, the second slot opening width distance, and the side-baffle spacing distance allow for reductions in velocity of water flowing in the channel at predetermined locations within the channel to allow the fish to swim upstream through the entire length of the channel.

3. The fish ladder of claim 1, wherein the first plurality of side-baffles and the second plurality of side-baffles alternate in location along a length of the channel between the first sidewall and the second sidewall.

4. The fish ladder of claim 1, wherein each one of the first plurality of side-baffles and second plurality of side-baffles are attached at a baffle angle with respect to the corresponding first and second sidewalls to extend upstream in the channel.

5. The fish ladder of claim 4, wherein the baffle angle is in the range of from 55° to 65°.

6. The fish ladder of claim 5, wherein the baffle angle is 60°.

7. The fish ladder of claim 1, wherein each of the first slot opening width distance and the second slot opening width distance is 42% of the channel width distance.

8. The fish ladder of claim 1, wherein the side-baffle spacing distance is 42% of the channel width distance.

9. The fish ladder of claim 1, wherein the first and second sidewalls are disposed parallel to each other.

10. The fish ladder of claim 1, wherein the first and second sidewalls are straight and are disposed parallel to each other along an entire length of the channel.

11. The fish ladder of claim 1, wherein each of the first and second sidewalls are curved for at least a portion of the channel.

12. The fish ladder of claim 1, wherein a slope of the channel when disposed at a location of flowing water is in a range of from 5% to 9% from an upstream portion of the fish ladder to a downstream portion of the fish ladder.

13. The fish ladder of claim 12, wherein the slope of the channel when disposed at a location of flowing water is 8%.

* * * * *